United States Patent
Srinivasan et al.

(10) Patent No.: US 12,341,857 B2
(45) Date of Patent: Jun. 24, 2025

(54) METHOD AND SYSTEM TO USE COMPUTING DEVICE TO OBTAIN OPERATOR PREFERENCES AND CONFIGURATIONS USED BY AVIONICS PROCESSING UNIT

(71) Applicant: Honeywell International Inc., Charlotte, NC (US)

(72) Inventors: Divya Swarup Giriyappa Srinivasan, Bangalore (IN); Thomas D. Judd, Phoenix, AZ (US)

(73) Assignee: Honeywell International Inc., Charlotte, NC (US)

(*) Notice: Subject to any disclaimer, the term of this patent is extended or adjusted under 35 U.S.C. 154(b) by 0 days.

(21) Appl. No.: 18/477,412

(22) Filed: Sep. 28, 2023

(65) Prior Publication Data
US 2025/0063094 A1    Feb. 20, 2025

(30) Foreign Application Priority Data
Aug. 16, 2023  (IN) .............................. 202311054850

(51) Int. Cl.
H04L 67/00    (2022.01)
(52) U.S. Cl.
CPC .................................. *H04L 67/34* (2013.01)
(58) Field of Classification Search
None
See application file for complete search history.

(56) References Cited

U.S. PATENT DOCUMENTS

| | | | |
|---|---|---|---|
| 8,219,799 B1 * | 7/2012 | Lucchesi | H04L 63/302 713/153 |
| 8,220,038 B1 * | 7/2012 | Lucchesi | H04L 63/105 726/4 |
| 10,154,096 B2 * | 12/2018 | Coulmeau | B64D 47/00 |
| 10,586,459 B2 * | 3/2020 | Srinivasan | G08G 5/0013 |
| 10,666,764 B2 | 5/2020 | Judd et al. | |
| 10,798,033 B2 | 10/2020 | Judd et al. | |
| 11,258,863 B1 | 2/2022 | Hochwarth et al. | |

(Continued)

OTHER PUBLICATIONS

Anonymous, "Electronic flight bag", Wikipedia, Jul. 23, 2023, retrieved by EPO on Dec. 28, 2024 from https://en.wikipedia.org/w/index.php?title=Electronic_flight_bag&p;dod=1167059846, pp. 1 through 6.

(Continued)

*Primary Examiner* — Phyllis A Book
(74) *Attorney, Agent, or Firm* — Fogg & Powers LLC

(57) ABSTRACT

A method and system for airline operation center (AOC) data communications are disclosed. The method comprises providing a computing device for use onboard an aircraft, with the computing device hosting at least one application configured to interact with at least one avionics processing unit onboard the aircraft. The method further comprises automatically retrieving, by the at least one application, AOC information for storage and processing on the computing device, and transmitting by the at least one application, the AOC information from the computing device to the at least one avionics processing unit. The AOC information is used by the at least one avionics processing unit to execute an AOC application hosted by the at least one avionics processing unit.

20 Claims, 4 Drawing Sheets

(56) References Cited

U.S. PATENT DOCUMENTS

| | | | |
|---|---|---|---|
| 2009/0058682 A1* | 3/2009 | True | H04L 67/12 |
| | | | 701/3 |
| 2010/0232295 A1* | 9/2010 | True | H04L 45/80 |
| | | | 370/238 |
| 2014/0075506 A1* | 3/2014 | Davis | H04B 7/18508 |
| | | | 726/3 |
| 2018/0276996 A1* | 9/2018 | Srinivasan | G08G 5/0013 |
| 2018/0287971 A1* | 10/2018 | Judd | H04B 7/18506 |
| 2019/0222298 A1* | 7/2019 | Abeel | G08G 5/0021 |
| 2022/0157089 A1* | 5/2022 | Srinivasan | G06F 16/9035 |

OTHER PUBLICATIONS

European Patent Office, "Extended European Search Report", dated Jan. 14, 2025, from EP Application No. 24190250.1, from Foreign Counterpart to U.S. Appl. No. 18/477,412, pp. 1 through 9, Published: EP.

* cited by examiner

METHOD AND SYSTEM TO USE COMPUTING DEVICE TO OBTAIN OPERATOR PREFERENCES AND CONFIGURATIONS USED BY AVIONICS PROCESSING UNIT

CROSS-REFERENCE TO RELATED APPLICATIONS

This application claims the benefit of Indian Patent Application number 202311054850, filed on Aug. 16, 2023, same title, which is hereby incorporated herein by reference in its entirety.

BACKGROUND

Loading airline operation center (AOC) database information onto a communications system of an aircraft, such as a communications management unit (CMU), is time consuming and costly. Typically, this process involves a maintenance engineer who manually loads the AOC database to the CMU of the aircraft. Moreover, it can take months of manpower for an entire airline fleet to be loaded with an updated AOC database.

SUMMARY

A method and system for airline operation center (AOC) data communications are disclosed. The method comprises providing a computing device for use onboard an aircraft, with the computing device hosting at least one application configured to interact with at least one avionics processing unit onboard the aircraft. The method further comprises automatically retrieving, by the at least one application, AOC information for storage and processing on the computing device, and transmitting by the at least one application, the AOC information from the computing device to the at least one avionics processing unit. The AOC information is used by the at least one avionics processing unit to execute an AOC application hosted by the at least one avionics processing unit.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail using the accompanying drawings, in which.

DETAILED DESCRIPTION

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

A method and system to utilize a computing device to obtain operator preferences and configurations, for use by an avionics processing unit, are described herein.

In one embodiment, a computing device such as an electronic flight bag (EFB) can be used to provide airline operation center (AOC) database information to an avionics processing unit such as a communications management unit (CMU) of an aircraft. The EFB can provide the AOC database information to the CMU via an interface when there is an update or always. Alternatively, the CMU can query the AOC information from the EFB to obtain the AOC information needed for CMU operations. The EFB then returns the AOC information to the CMU. For airlines, with WiFi or cellular links, for example, the AOC database on the EFB can be remotely uploaded to the CMU without involvement of a field engineer.

In various embodiments, a secured interface is provided between the computing device and the avionics processing unit. For example, the secured interface can be a direct interface, or can be provided via an aircraft interface device (AID) or a server. For example, a CMU and a EFB can communicate securely directly or indirectly through the AID or the server.

The present approach has the benefit of eliminating the need for maintenance engineers to manually load AOC information updates onto aircraft. In addition, this approach allows for frequent loading of AOC database updates, with no ACARS data transfer from ground to air (service provider cost). This approach also reduces the time taken to update an airline fleet, and helps in increasing airline operational efficiency. Further, the data that is typically in data located in AOC databases or air traffic control (ATC) databases, and which are loaded in the CMU, can now reside on an EFB as a database or as an application on the EFB, to provide communication related preferences to the CMU.

Further details regarding the present approach are described as follows and with reference to the drawings.

Figure 1:
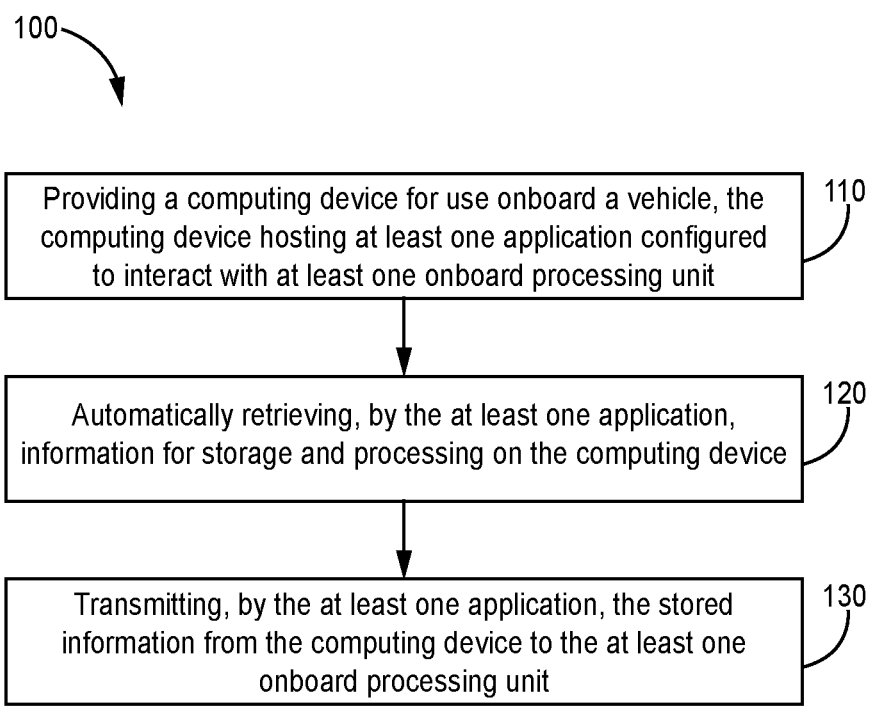
FIG. 1 is a flow diagram of an example method for data communications, according to one implementation.

FIG. 1 is a flow diagram of an example method 100 for implementing the present approach. The method 100 comprises providing a computing device for use onboard a vehicle, such as an aircraft, with the computing device hosting at least one application configured to interact with at least one onboard processing unit, such as an avionics processing unit onboard the aircraft (block 110). The method 100 further comprises automatically retrieving, by the at least one application, information for storage and processing on the computing device, such as AOC information (block 120). The method 100 also comprises transmitting, by the at least one application, the stored information, such as AOC information, from the computing device to the at least one onboard processing unit, such as the avionics processing unit (block 130). For example, the AOC information is used by the avionics processing unit to execute an AOC application hosted by the avionics processing unit.

The avionics processing unit in method 100 can include a CMU, a communications management function (CMF), or the like. In one implementation, the computing device used in method 100 can be a portable computing device, such as an EFB implemented in a tablet or smart phone, which is accessible by a CMU. In another embodiment, the computing device can be mounted on the vehicle such as in the cockpit of an aircraft. In other embodiments, the computing device can be a cabin terminal, or a maintenance device.

In one implementation, the AOC information can be automatically transmitted from an AOC database, which resides in the computing device, to the avionics processing unit CMU. In another implementation, the AOC information is transmitted after the avionics processing unit sends a request for the AOC information to the computing device. For example, all available AOC information can be requested by a CMU, or AOC information can be requested by the CMU on an as needed basis.

Figure 2:
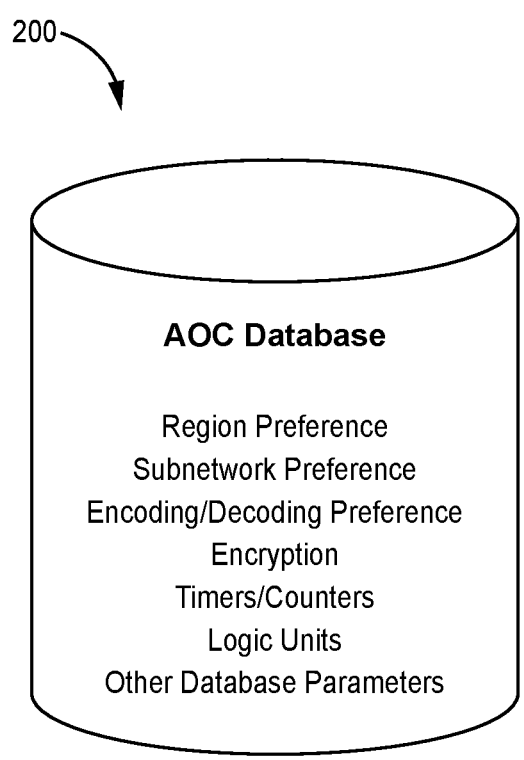
FIG. 2 is a block diagram of an exemplary AOC database, which can be utilized by the method of FIG. 1.

FIG. 2 is a block diagram of an exemplary AOC database 200, including a non-limiting example list of information indicative of the contents of AOC database 200. The information in AOC database 200 can be used by a CMU, for example, to configure or perform various functions on the CMU. As shown in FIG. 2, AOC database 200 can include region preferences, subnetwork preferences, encoding/decoding preferences, encryption protocols, timers or counters, logic units, other database parameters, and the like. In addition, AOC database 200 can include the following types of information for use by the CMU for doing datalink: security keys, certificates and algorithms; and compression algorithms.

For example, the AOC information can be used by the CMU to determine the format of messages, when messages are supposed to be sent, and how to route messages; to determine which service provider to use for datalink messages, and which subnetworks to use; to determine how to compress a message or whether a message has to be compressed; and to determine whether to encrypt a message. In addition, some messages can be created by or received by an AOC application.

Figure 3:
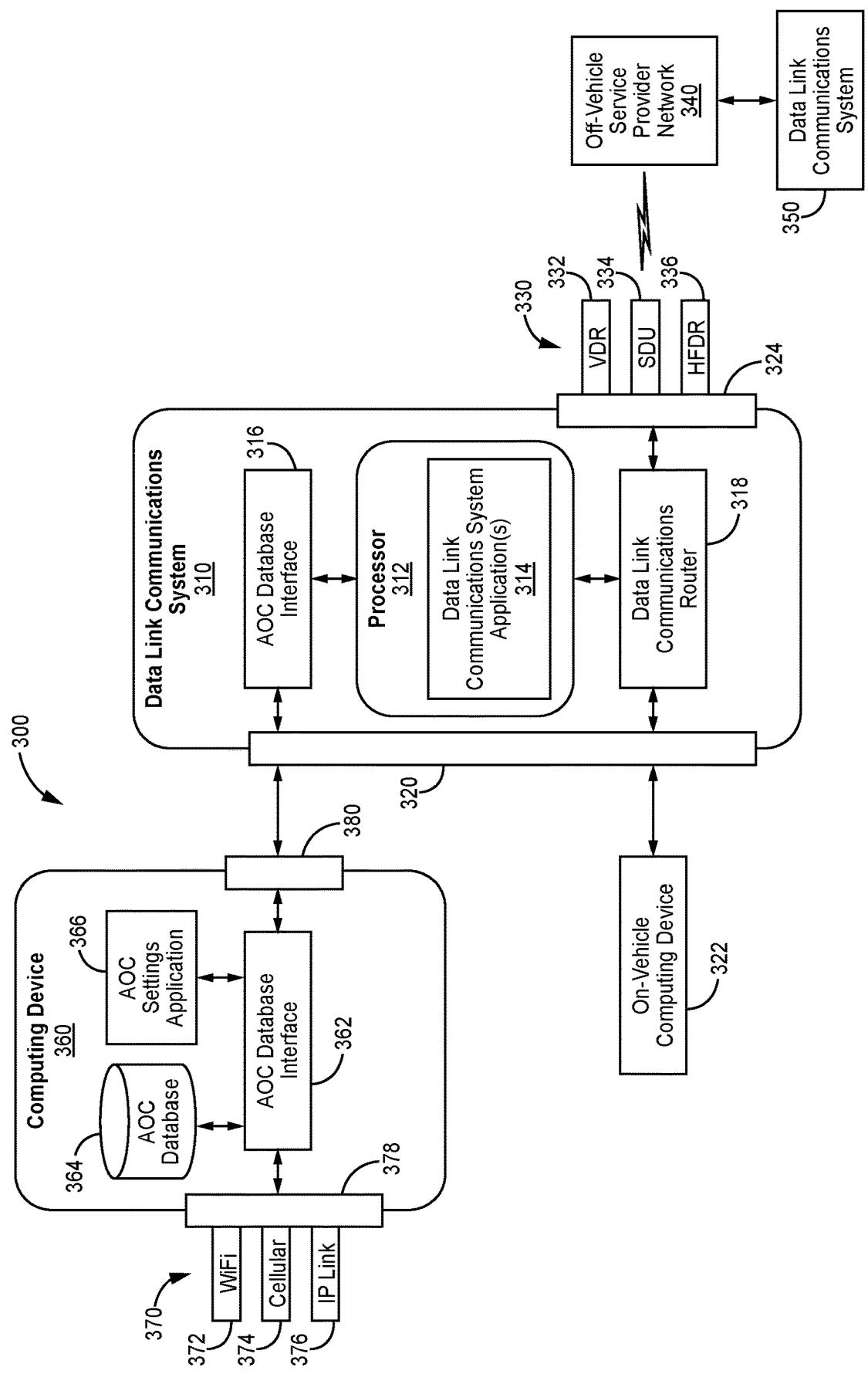
FIG. 3 is a block diagram of an exemplary system for AOC data communications, according to one embodiment.

FIG. 3 is a block diagram of an exemplary system 300 for AOC data communications, which can implement the present approach according to one embodiment. The system 300 includes a data link communications system 310, which is onboard a vehicle such as an aircraft. The data link communications system 310 can be a CMU, CMF, or the like. The data link communications system 310 includes at least one processor 312, which is configured to host and execute one or more data link communications system applications 314. The data link communications system 310 also includes an AOC database interface 316, which operatively communicates with the one or more data link communications system applications 314 through processor 312. A data link communications router 318 is in operative communication with the one or more data link communications system applications 314 through processor 312.

The AOC database interface 316 also operatively communicates a first interface bus 320. An on-vehicle computing device 322 is in operative communication with data link communications system 310 through first interface bus 320. The data link communications router 318 also operatively communicates with a second interface bus 324.

The data link communications system 310 is also operatively coupled to one or more communication devices 330, such as a very high frequency (VHF) data radio (VDR) 332, a satellite data unit (SDU) 334, and a high frequency data link radio (HFDR) 336. The data link communications router 318 operatively communicates with one or more communication devices 330 through second interface bus 324. An off-vehicle service provider network 340 provides network services for data link communications system 310 through one or more communication devices 330. The off-vehicle service provider network 340 is in operative communication with an off-vehicle data link communications system 350.

The system 300 also includes a computing device 360 for use onboard the vehicle. In some embodiments, computing device 360 can be a portable device with wireless connectivity such as a wireless EFB device (e.g., tablet, smart phone, or the like). Alternatively, computing device 360 can be a wired device in the vehicle, such as a device mounted in a cockpit of an aircraft. The computing device 360 includes an AOC database interface 362, an AOC database 364, and/or an AOC settings application 366.

For example, in one embodiment, computing device 360 can include just AOC database 364, which operatively communicates with AOC database interface 362. In another embodiment, computing device 360 can include just AOC settings application 366, which operatively communicates with AOC database interface 362. In a further embodiment, computing device 360 can include both AOC database 364 and AOC settings application 366, which operatively communicate with AOC database interface 362.

The computing device 360 includes one or more communication link functions operative for WiFi, cellular, or Internet Protocol (IP) link communications. For example, computing device 360 can includes one or more communication link devices 370, such as a WiFi device 372, a cellular device 374, and a IP link device 376. The communication link devices 370 are in operative communication with AOC database interface 362 through a third bus interface 378. The AOC database interface 362 also operatively communicates a fourth interface bus 380. The data link communications system 310 and computing device 360 are in operative communication with each other, such that AOC database interfaces 316 and 362 communicate with each other through interface buses 320 and 380.

During operation, a user such as a maintenance engineer loads AOC database 364 and/or AOC settings application 366, which contains AOC information, remotely onto computing device 360 via WiFi, cellular, or any IP link available, such as through WiFi device 372, cellular device 374, or IP link device 376. When an update is available, computing device 360 can automatically send the AOC information to data link communications system 310 via AOC database interface 362, which communicates with AOC database interface 316. Alternatively, data link communications system 310 can send a query to computing device 360, via AOC database interface 316, which communicates with AOC database interface 362, to automatically obtain the updated AOC information as needed for operations.

Figure 4:
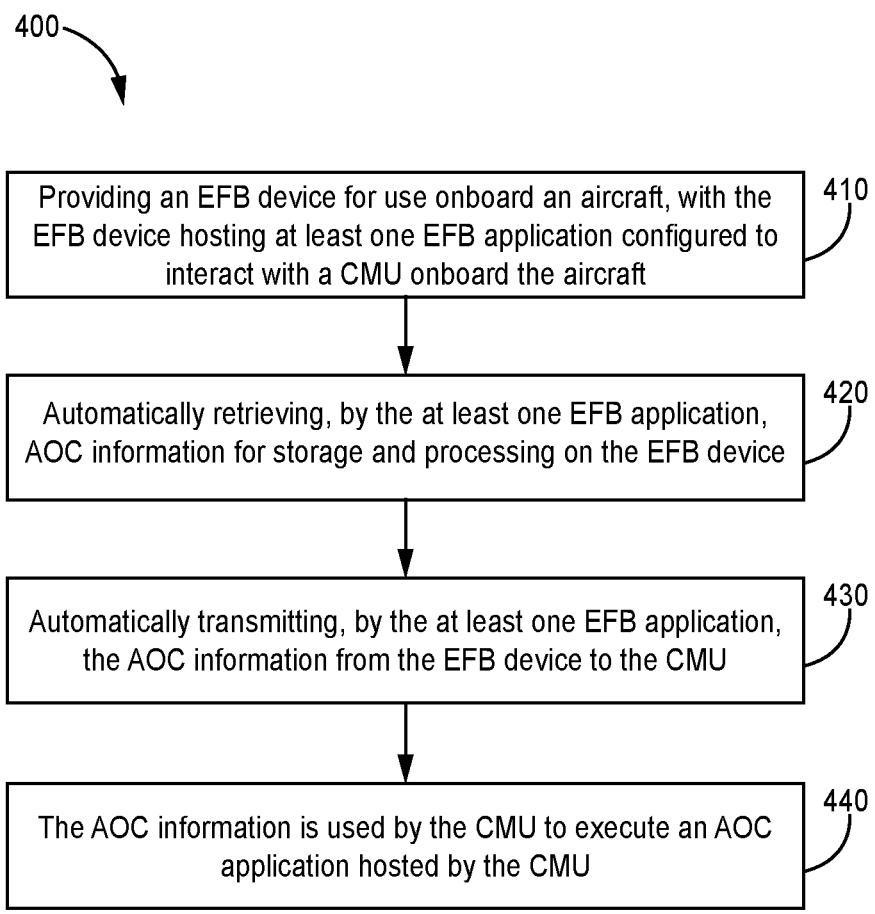
FIG. 4 is a flow diagram of an example method for data communications, according to another implementation.

FIG. 4 is a flow diagram of an example method 400 for data communications, according to another implementation. The method 400 comprises providing an EFB device for use onboard an aircraft, with the EFB hosting at least one EFB application configured to interact with a CMU onboard the aircraft (block 410). The method 400 further comprises automatically retrieving, by the at least one EFB application, AOC information for storage and processing on the EFB device (block 420). The method 400 also comprises automatically transmitting, by the at least one EFB application, the AOC information from the EFB device to the CMU (block 430). Thereafter, the AOC information is used by the CMU to execute an AOC application hosted by the CMU (block 440).

In other implementations, the AOC information can be requested by the CMU by sending a request to the EFB for the AOC information. For example, all available AOC information can be requested by the CMU, or AOC information can be requested by the CMU on an as needed basis.

EXAMPLE EMBODIMENTS

Example 1 includes a method comprising: providing a computing device for use onboard an aircraft, the computing device hosting at least one application configured to interact with at least one avionics processing unit onboard the aircraft; automatically retrieving, by the at least one application, airline operation center (AOC) information for storage and processing on the computing device; and transmitting, by the at least one application, the AOC information from the computing device to the at least one avionics processing unit; wherein the AOC information is used by the at least one avionics processing unit to execute an AOC application hosted by the at least one avionics processing unit.

Example 2 includes the method of Example 1, wherein the computing device comprises a portable computing device that is portable off the aircraft.

Example 3 includes the method of Example 2, wherein the portable computing device comprises an electronic flight bag (EFB).

Example 4 includes the method of any of Examples 1-3, wherein the computing device is mounted in the aircraft.

Example 5 includes the method of any of Examples 1-4, wherein the at least one avionics processing unit comprises a communications management unit (CMU), or a communications management function (CMF).

Example 6 includes the method of any of Examples 1-5, wherein the AOC information is automatically transmitted from the computing device to the at least one avionics processing unit.

Example 7 includes the method of any of Examples 1-5, wherein the AOC information is transmitted after the at least one avionics processing unit sends a request for the AOC information to the computing device.

Example 8 includes a system comprising: at least one avionics processing unit onboard an aircraft; an airline operation center (AOC) database configured to store AOC information useful to the aircraft; and a computing device for use onboard the aircraft, the computing device configured to host at least one application operative to interact with the at least one avionics processing unit and the AOC database; wherein the at least one application is operative to perform a process comprising: retrieving the AOC information from the AOC database; storing the AOC information on the computing device; and transmitting the stored AOC information from the computing device to the at least one avionics processing unit; wherein the AOC information is used by the at least one avionics processing unit to execute an AOC application hosted by the at least one avionics processing unit.

Example 9 includes the system of Example 8, wherein the at least one avionics processing unit comprises a communications management unit (CMU), or a communications management function (CMF).

Example 10 includes the system of any of Examples 8-9, wherein the computing device comprises a portable computing device that is portable off the aircraft.

Example 11 includes the system of Example 10, wherein the portable computing device comprises an electronic flight bag (EFB).

Example 12 includes the system of any of Examples 8-11, wherein the computing device is mounted in the aircraft.

Example 13 includes the system of any of Examples 8-12, further comprising a secured interface between the computing device and the at least one avionics processing unit, wherein the secured interface is a direct interface, or is provided via an aircraft interface device (AID) or a server.

Example 14 includes a system for airline operation center (AOC) data communications, the system comprising: a data link communications system onboard an aircraft, the data link communications system comprising: at least one processor configured to host and execute one or more data link communications system applications; a first AOC database interface, which operatively communicates with the one or more data link communications system applications via the at least one processor; and a data link communications router in operative communication with the one or more data link communications system applications via the at least one processor; a computing device for use onboard the aircraft, the computing device comprising: a second AOC database interface; and at least one or more of an AOC database or an AOC settings application, in operative communication with the second AOC database interface; wherein the data link communications system and the computing device are in operative communication with each other, such that the first and second AOC database interfaces operatively communicate with each other; wherein when an update of AOC information is available: the computing device is configured to automatically send the AOC information to the data link communications system via the second AOC database interface; or the data link communications system is configured to send a query to the computing device, via the first AOC database interface, to automatically obtain the updated AOC information from the computing device.

Example 15 includes the system of Example 14, wherein the data link communications system comprises a communications management unit (CMU), or a communications management function (CMF).

Example 16 includes the system of any of Examples 14-15, wherein the data link communications system is operatively coupled to one or more communication devices comprising a very high frequency (VHF) data radio, a satellite data unit, or a high frequency data link radio.

Example 17 includes the system of Example 16, wherein the data link communications router operatively communicates with the one or more communication devices through an interface bus.

Example 18 includes the system of any of Examples 14-17, wherein the computing device comprises a portable computing device that is portable off the aircraft.

Example 19 includes the system of any of Examples 14-17, wherein the computing device is mounted in a cockpit of the aircraft.

Example 20 includes the system of any of Examples 14-19, wherein the computing device includes one or more communication link functions operative for WiFi, cellular, or Internet Protocol (IP) link communications.

From the foregoing, it will be appreciated that, although specific embodiments have been described herein for purposes of illustration, various modifications may be made without deviating from the scope of the disclosure. Thus, the described embodiments are to be considered in all respects only as illustrative and not restrictive. In addition, all changes that come within the meaning and range of equivalency of the claims are to be embraced within their scope.

What is claimed is:

1. A method comprising:
   providing a computing device for use onboard an aircraft, the computing device hosting at least one application configured to interact with at least one avionics processing unit onboard the aircraft;
   automatically retrieving, by the at least one application, airline operation center (AOC) information for storage and processing on the computing device; and
   automatically transmitting, by the at least one application, the AOC information from the computing device to the at least one avionics processing unit;

wherein the AOC information is used by the at least one avionics processing unit to execute an AOC application hosted by the at least one avionics processing unit.

2. The method of claim 1, wherein the computing device comprises a portable computing device that is portable off the aircraft.

3. The method of claim 2, wherein the portable computing device comprises an electronic flight bag (EFB).

4. The method of claim 1, wherein the computing device is mounted in the aircraft.

5. The method of claim 1, wherein the at least one avionics processing unit comprises a communications management unit (CMU), or a communications management function (CMF).

6. The method of claim 1, wherein the AOC information comprises:
region preferences, subnetwork preferences, encoding/decoding preferences, encryption protocols, timers/counters, and logic units; or
security keys, security certificates, security algorithms, and compression algorithms.

7. A system comprising:
at least one avionics processing unit onboard an aircraft;
an airline operation center (AOC) database configured to store AOC information useful to the aircraft; and
a computing device for use onboard the aircraft, the computing device configured to host at least one application operative to interact with the at least one avionics processing unit and the AOC database;
wherein the at least one application is operative to perform a process comprising:
automatically retrieving the AOC information from the AOC database;
storing the AOC information on the computing device; and
automatically transmitting the stored AOC information from the computing device to the at least one avionics processing unit;
wherein the AOC information is used by the at least one avionics processing unit to execute an AOC application hosted by the at least one avionics processing unit.

8. The system of claim 7, wherein the at least one avionics processing unit comprises a communications management unit (CMU), or a communications management function (CMF).

9. The system of claim 7, wherein the computing device comprises a portable computing device that is portable off the aircraft.

10. The system of claim 9, wherein the portable computing device comprises an electronic flight bag (EFB).

11. The system of claim 7, wherein the computing device is mounted in the aircraft.

12. The system of claim 7, further comprising a secured interface between the computing device and the at least one avionics processing unit, wherein the secured interface is a direct interface, or is provided via an aircraft interface device (AID) or a server.

13. The system of claim 7, wherein the AOC database includes:
region preferences, subnetwork preferences, encoding/decoding preferences, encryption protocols, timers/counters, and logic units; or
security keys, security certificates, security algorithms, and compression algorithms.

14. A system for airline operation center (AOC) data communications, the system comprising:
a data link communications system onboard an aircraft, the data link communications system comprising:
at least one processor configured to host and execute one or more data link communications system applications;
a first AOC database interface, which operatively communicates with the one or more data link communications system applications via the at least one processor; and
a data link communications router in operative communication with the one or more data link communications system applications via the at least one processor; and
a computing device for use onboard the aircraft, the computing device comprising:
a second AOC database interface; and
an AOC database and an AOC settings application, which are in operative communication with the second AOC database interface;
wherein the data link communications system and the computing device are in operative communication with each other, such that the first and second AOC database interfaces operatively communicate with each other;
wherein when an update of AOC information is available:
the computing device is configured to automatically send the AOC information to the data link communications system via the second AOC database interface.

15. The system of claim 14, wherein the data link communications system comprises a communications management unit (CMU), or a communications management function (CMF).

16. The system of claim 14, wherein the data link communications system is operatively coupled to one or more communication devices comprising a very high frequency (VHF) data radio, a satellite data unit, or a high frequency data link radio.

17. The system of claim 16, wherein the data link communications router operatively communicates with the one or more communication devices through an interface bus.

18. The system of claim 14, wherein the computing device comprises a portable computing device that is portable off the aircraft.

19. The system of claim 14, wherein the computing device is mounted in a cockpit of the aircraft.

20. The system of claim 14, wherein the computing device includes one or more communication link functions operative for WiFi, cellular, or Internet Protocol (IP) link communications.

* * * * *